United States Patent
Smith, Jr. et al.

(10) Patent No.: US 7,754,837 B1
(45) Date of Patent: Jul. 13, 2010

(54) FLOURINATED ARYL ETHER POLYMERS EXHIBITING DUAL FLUOROOLEFIN FUNCTIONALITY AND METHODS OF FORMING SAME

(75) Inventors: Dennis W. Smith, Jr., Seneca, SC (US); Scott T. Iacono, Greenville, SC (US)

(73) Assignee: Clemson University Research Foundation, Anderson, SC (US)

( * ) Notice: Subject to any disclaimer, the term of this patent is extended or adjusted under 35 U.S.C. 154(b) by 92 days.

(21) Appl. No.: 12/044,447

(22) Filed: Mar. 7, 2008

Related U.S. Application Data

(60) Provisional application No. 60/894,034, filed on Mar. 9, 2007.

(51) Int. Cl.
*C08F 16/24* (2006.01)

(52) U.S. Cl. ............ 526/247; 526/292.9; 526/293; 526/294; 526/295; 526/309; 526/347.1; 568/634; 568/660; 568/661

(58) Field of Classification Search .......... 526/247
See application file for complete search history.

(56) References Cited

U.S. PATENT DOCUMENTS

| | | | |
|---|---|---|---|
| 4,125,692 A * | 11/1978 | Cheradame et al. ...... 525/359.4 |
| 4,396,728 A | 8/1983 | Faler |
| 4,675,380 A | 6/1987 | Buckmaster et al. |
| 5,037,917 A | 8/1991 | Babb et al. |
| 5,037,919 A | 8/1991 | Clement et al. |
| 5,081,192 A | 1/1992 | Tatemoto |
| 5,159,038 A | 10/1992 | Babb et al. |
| 5,198,513 A | 3/1993 | Clement et al. |
| 5,288,926 A | 2/1994 | Patrascu |
| 5,364,917 A | 11/1994 | Babb et al. |
| 5,578,737 A | 11/1996 | Clement |
| 6,107,422 A * | 8/2000 | Wang et al. ............ 526/243 |
| 6,344,286 B1 | 2/2002 | Kim et al. |
| 6,384,288 B1 | 5/2002 | Kuhling et al. |
| 6,620,939 B2 | 9/2003 | Webb et al. |
| 6,649,715 B1 | 11/2003 | Smith et al. |
| 6,689,855 B2 | 2/2004 | Smith et al. |
| 6,696,534 B2 | 2/2004 | Smith et al. |
| 6,737,479 B2 | 5/2004 | Faulkner |
| 6,774,164 B2 | 8/2004 | Lyons et al. |
| 6,814,887 B2 | 11/2004 | Okunaka et al. |
| 6,953,653 B2 | 10/2005 | Smith et al. |
| 7,001,678 B2 | 2/2006 | Casasanta, III et al. |
| 7,008,556 B2 | 3/2006 | Casasanta, III et al. |
| 7,053,149 B2 | 5/2006 | Anderson et al. |
| 2002/0161101 A1 | 10/2002 | Carroll et al. |

OTHER PUBLICATIONS

Article—Iacono, et al., "Facile preparation of fluorovinylene aryl ether telechelic polymers with dual functionality for thermal chain extension and tandem crosslinking", *Chem. Commun.*, 2006, pp. 4844-4846.

Iacono, et al., "Photoluminescent Studies of New Conjugated Fluorinated Ether Polymers", PMSE Preprints, vol. 94, Feb. 12, 2007.

* cited by examiner

*Primary Examiner*—David Wu
*Assistant Examiner*—Nicole M Buie-Hatcher
(74) *Attorney, Agent, or Firm*—Dority & Manning, P.A.

(57) ABSTRACT

Disclosed are telechelic fluoropolymers and methods for forming the polymers. The fluoropolymers can be formed via step-growth polymerization of bis(trifluorovinyloxy)biphenyls with bisphenols. The formed telechelic polymers possess fluoroolefin functionality at the trifluorovinyl aromatic ether endgroups. Internal groups can include difluorodioxyvinylene groups and trifluoroethyl groups. Formation methods of the telechelic polymers can be controlled so as to control molecular weight and degree of unsaturation of the polymers. The end groups and the internal groups can be further reacted independently of each other, e.g., under different temperature conditions, to form a variety of polymers and/or crosslinked polymeric networks.

10 Claims, No Drawings

FLOURINATED ARYL ETHER POLYMERS EXHIBITING DUAL FLUOROOLEFIN FUNCTIONALITY AND METHODS OF FORMING SAME

CROSS REFERENCE TO RELATED APPLICATION

The present application claims filing benefit of U.S. Provisional Patent Application Ser. No. 60/894,034 having a filing date of Mar. 9, 2007, which is incorporated herein in its entirety.

FEDERALLY SPONSORED RESEARCH AND DEVELOPMENT

The United States Government may have rights to the information disclosed herein pursuant to grants from the National Science Foundation (DMR 0514622) and the Defense Advanced Research Projects Agency (N66001-03-1-8900).

BACKGROUND

Fluoropolymers have provided great benefit in a variety of industries. For instance, a variety of perfluoroether polymers have been developed that can exhibit low surface energies, good thermal retardance, high chemical resistance, and excellent electrical insulating properties.

Most fluoropolymers are prepared by a radical-mediated chain growth polymerization process. Nucleophilic addition of functionalized alcohols to perfluorinated olefins is also a viable route to making fluoropolymers, specifically perfluorinated alkyl ethers. Similarly, hydrochlorofluorcarbons have been synthesized via nucleophilic addition reactions to produce environmentally benign alternatives to products such as degreasing solvents, low viscosity lubricants, and refrigerants. Nucleophilic addition to fluorinated alkenes is of major commercial importance in the fluoroelastomer industry where, for example, phenols and amines are used to crosslink unsaturated fluoropolymers.

Unfortunately, most fluoropolymers exhibit a high degree of crystallinity and poor solubility and as such require labor-intensive processing conditions as well as costly effluent waste management. Accordingly, what are needed in the art are more cost-effective methods of forming and utilizing fluoropolymers. Additionally, what is needed in the art are fluoropolymers that can be prepared and processed according to less expensive and more environmentally friendly processing methods.

SUMMARY

In one embodiment, disclosed are telechelic polymers comprising dual endgroup fluoroolefin functionalities. For instance, the telechelic polymers can include trifluorovinyl aromatic ether endgroups. In addition to the dual endgroup fluoroolefin functionalities, the telechelic polymers can includes internal fluoroolefin segments along the polymer backbone. More specifically, the fluorine atoms of the fluoroolefin segments can be covalently bonded directly to the straight chain carbon atoms of the polymer backbone.

Also disclosed are methods for forming the disclosed telechelic polymers as well as methods for forming crosslinked polymeric networks including disclosed telechelic polymers. For instance, a method for forming a telechelic polymer can include combining a bis(trifluorovinyloxy)biphenyl compound with a bisphenol compound. Upon combination, the mixture can be heated to a temperature between about 35° C. and about 80° C. Upon heating the two compounds, a step-growth polymerization reaction can occur to form a telechelic polymer.

Also disclosed are perfluorocyclobutyl (PFCB) polymers that can be formed according to a thermal cyclodimerization scheme upon heating the telechelic polymers to a temperature that is greater than the initial formation temperature, for instance a temperature between about 120° C. and about 190° C. Moreover, upon heating the PFCB polymers to a yet higher temperature, for instance between about 225° C. and about 250° C., crosslinked polymeric networks can be formed.

DETAILED DESCRIPTION

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to the present disclosure without departing from the scope or spirit of the disclosure. For instance, features illustrated or described as part of one embodiment, may be used in another embodiment to yield a still further embodiment. Thus, it is intended that the present disclosure cover such modifications and variations as come within the scope of the appended claims and their equivalents.

The present disclosure is generally directed to fluoropolymers that can exhibit dual fluoroolefin functionality and are telechelic in nature. The disclosure is also directed to methods for forming the polymers and methods for processing the polymers. In one embodiment, the disclosed telechelic polymers can be formed from commercially available starting materials according to relatively simple step-growth polymerization schemes that require minimal air/moisture manipulation and provide excellent control mechanisms for controlling the characteristics of the polymers. Following formation, the telechelic polymers can be easily purified. Further processing of the polymers can also be carried out via relatively simple routes. For instance, due to the dual fluoroolefin functionality of the telechelic polymers, the telechelic polymers can be subjected to a first set of reaction conditions to induce thermal chain growth of the polymers that can react with themselves or other monomers to produce processable homopolymers and copolymers; respectfully. Upon subjection to a second set of conditions, cross-linking can be initiated to form an insoluble polymeric thermoset network that exhibits no glass transition temperature ($T_g$). Moreover, both sets of reaction conditions can be thermally controlled and processing can be carried out without the need for expensive co-reactants such as curing agents.

Telechelic polymers as disclosed herein can generally be formed via step-growth polymerization of bis(trifluorovinyloxy)biphenyls with bisphenols. Bis(trifluorovinyloxy)biphenyls as may be utilized can include those having the general structure:

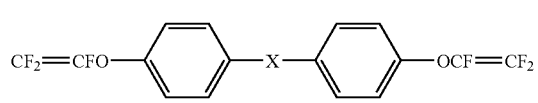

X in the above general structure can be any suitable linking structure and can in one embodiment facilitate formation of the disclosed polymers and/or impart desired characteristics to oligomers, polymers, or polymeric networks formed from the monomers. For instance, X can be a bond or can include one or more of a substituted or unsubstituted, saturated or unsaturated alkyl group including straight-chain, branched chain, or cyclic groups; a substituted or unsubstituted aromatic group; an atomic linking group, such as an oxygen atom or a sulfur atom. Linking structure X can include one or more of carboxylic and/or thiocarboxylic ester groups; other sulfur-containing linking structures; perfluoroalkylenes; perfluoroalkylene ethers; alkylenes; acetylenes; phosphorus containing groups such as phosphines; carbonyl and thio carbonyl groups; silicon-containing groups such as silanediyl, trisilanediyl tetrasilanetetrayl, siloxanediyl, disiloxanediyl, trisiloxyl, trisilazanyl, or silylthio groups; boron-containing groups such as boranediyl or methylboranediyl groups; selenium-containing structures; tellurium-containing structures; nitrogen-containing linking structures; transition metals (chelates, etc.); or combinations thereof.

Bis(trifluorovinyloxy)biphenyls and methods of forming bis(trifluorovinyloxy)biphenyls are known in the art. For instance, U.S. Pat. No. 5,037,917 to Babb, et al., which is incorporated herein by reference, discloses exemplary bis (trifluorovinyloxy)biphenyls monomers and methods of forming the monomers as may be utilized herein. Bis(trifluorovinyloxy)biphenyls as may be utilized herein are also available commercially, for instance from Tetramer Technologies, L.L.C. of Pendleton, S.C.

To form the disclosed telechelic polymers, bis(trifluorovinyloxy)biphenyl monomers can be polymerized with bisphenol monomers having the following general structure:

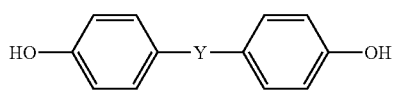

The linking structure, Y, of the bisphenol can be independently any suitable linking structure as described above for the linking structure X of the bis(trifluorovinyloxy)biphenyl starting material. Bisphenols suitable for use in the disclosed formation process are available commercially (for instance from Tetramer Technologies, L.L.C.) or may be formed according to formation processes as are generally known in the art. For example, U.S. Pat. Nos. 4,396,728, 5,288,926, 6,384,288, and 6,620,939, all of which are incorporated herein by reference, describe materials and methods useful in forming bisphenols as may be utilized herein.

In one particular embodiment, one or both of the linking structures of the monomers can be selected to provide desired characteristics to the formed polymers. For instance, starting materials can include chromophoric functional groups so as to provide telechelic polymers that can exhibit photoluminescent properties. According to this embodiment, any of a variety of conjugated π systems that can provide chromophoric characteristics to the polymers can be provided in a linking structure in one or both of the starting monomers. Exemplary chromophoric functional groups that can be included as a linking structure of a bisphenol and/or a bis(trifluorovinyloxy)biphenyl starting material can include azo groups, anthocyanins, thiophene, phenylvinylene, fluorenones, fullerenes and the like.

According to one formation process, the telechelic polymers disclosed herein can be formed via a relatively simple step-growth polymerization process. The process can be thermally controlled and can provide prepolymers having a predetermined size as well as a predetermined type and quantity of internal fluoroolefin reactivity. For example, a salt of the bisphenol starting material can be generated in a suitable solvent and this solution can then be added dropwise to an excess solution of bis(trifluorovinyloxy)biphenyl of choice. Upon heating the mixture, for instance to a temperature of between about 35° C. and about 80° C. for a period of time, e.g., between about 30 minutes and about 24 hours, the starting materials can polymerize according to the following general reaction Scheme 1:

Scheme 1

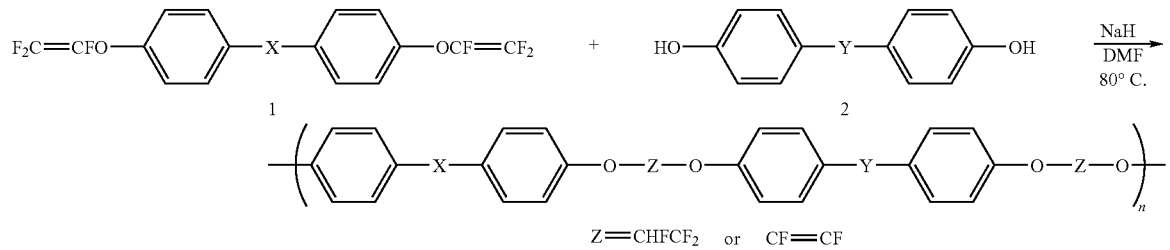

Molecular weight distribution of the telechelic prepolymers formed according to the process can be controlled through controlling the stoichiometry of the starting materials as well as by the order of addition of the starting materials to the formation reaction. For example, high molecular weight step-growth polymers having a number average molecular weight ($M_n$) greater than about 10,000 can be prepared using a 1:1 feedstock of the two starting materials.

Polymerization of the two starting materials can produce a 1:1 cis:trans ratio of internal fluoroolefins, which is consistent with other known phenol additions to perfluorovinyl aliphatic ethers.

In one embodiment, the degree of unsaturation of the formed polymers, i.e., the ratio of $CHFCF_2$ groups to $CF=CF$ groups, can be controlled through selection of the X and Y spacer groups of the starting materials. For instance, a spacer group that is a stronger electron withdrawing group, e.g., a perfluoropropane group (X or Y=—$C(CF_3)_2$—), can retard the degree of unsaturation of the formed polymer. In one embodiment, the formed polymer can exhibit a degree of unsaturation of less than about 5%. The telechelic polymers can be formed with even greater amounts of dehydrofluorinated internal fluoroolefins in other embodiments. For example, telechelic polymers as disclosed herein can exhibit a degree of unsaturation of less than about 75%, or less than about 90% in another embodiment. In one embodiment, the polymer can exhibit a degree of unsaturation of about 92%.

As utilized herein, the degree of unsaturation can be determined according to the standard formula, i.e., $(2C+2-H-X+N)/2$ where C is the number of carbon atoms, H is the number of hydrogen atoms, X is the number of halide atoms, and N is the number of nitrogen atoms.

The degree of unsaturation of the telechelic polymer can be further refined following initial formation. For instance, following formation, the polymer can be further dehydrofluorinated through employment of a suitable base to decrease the degree of unsaturation. For example, treatment of the polymer in tetrahydrofuran (THF) with lithium diisopropyl amine (LDA) at room temperature followed by heating to about 50° C. for about 24 hours can further decrease the degree of unsaturation of the polymer.

The telechelic polymers thus formed can include dual fluoroolefin functionality. More specifically, the trifluorovinyl aromatic ether endgroups of the polymers can provide a route to additional reaction via a first set of reaction conditions, and the internal difluorodioxyvinylene of the polymers can provide a route to additional reaction via a second set of reaction conditions. Moreover, the different reaction conditions for the different reaction routes can be thermally controlled, without the need for expensive, complicated control mechanisms utilizing catalysts, reactive reagents, or environmental conditions such as high pressure conditions.

In one embodiment, the disclosed polymers can undergo step-growth thermal cyclodimerization of the trifluorovinyl ether endgroups to form larger perfluorocyclobutyl (PFCB) polymers. PFCB formation can be carried out via chain extension of one or more telechelic polymers as described herein or via copolymerization of a telechelic polymer with other trifluorovinyl ether polymers as are known in the art.

Chain extension of a telechelic polymer via PFCB formation can proceed according to the following generalized reaction Scheme 2:

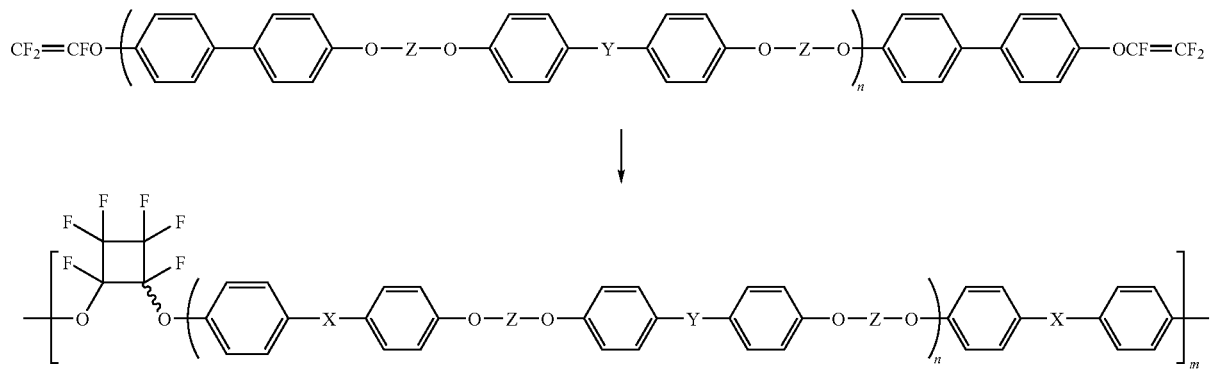

Disclosed PFCB formation reactions can generally be carried out at reaction conditions similar to those known for other, previously known PFCB formation reactions. For instance, PFCB formation chain extension reactions can be carried out at temperatures of between about 120° C. and about 190° C. In one embodiment, thermal chain extension of a telechelic polymer can be carried out via thermal PFCB formation at about 210° C.

PFCB polymers as described herein can be beneficially utilized in a variety of applications similar to other previously known PFCB materials. For instance, the disclosed PFCB materials can be formed with a particular functional group as the X and/or Y component, as discussed above, and utilized in forming high performance optical materials, organic nanomaterials, polymer light-emitting diodes, space survivable materials, polymeric fuel cell membranes, photolithography, high use temperature fluorosilicones, liquid crystal polymers, and the like. Further description of exemplary applications for PFCB polymers as described herein can be found in, e.g., U.S. Pat. Nos. 6,649,715, 6,696,534, 6,689,855, and 6,953,653 to Smith, et al. and U.S. Patent Application Publication 2002/0161101 to Carroll, et al., all of which are incorporated herein by reference.

The disclosed telechelic polymers are not limited to use in formation of PFCB polymers, however, and it should be understood that telechelic polymers as described herein can be subjected to other types of chain extension reactions. For instance, the trifluorovinyl aromatic ether endgroups of a telechelic polymer can be reacted with other materials to form larger polymers. For example, bisphenol monomers or polymers can react with the telechelic prepolymers to afford polymers, and, in one embodiment, block copolymers.

In addition to the trifluorovinyl aromatic ether endgroups, the telechelic polymers can also include internal fluoroolefin groups. These internal groups can be maintained throughout the chain extension reactions of the endgroups discussed above. Specifically, up to temperatures of about 190° C., both internal saturated perfluoroolefin groups and internal unsaturated trifluoroethyl groups will not be affected. Moreover, these internal groups are not subject to radical polymerization processes with either photoinitiators or thermal initiators. Thus, even should a telechelic polymer as described herein be subjected to reaction involving a radical polymerization process, the internal groups of the polymer can remain intact.

In one embodiment, the internal fluoroolefin groups can be thermally crosslinked to form a polymeric network. For example, following a chain extension PFCB formation process at a first temperature, the polymers can be further heated to a second temperature of between about 225° C. and about 250° C., for instance about 225° C., which can induce crosslinking of the internal fluoroolefin groups remaining in the polymer. Network polymers formed from such a process can be insoluble and can have no observable glass transition temperature below 350° C. Moreover, as the degree of unsaturation of the telechelic polymers can be controlled, as discussed above, this can also provide a route for controlling the crosslink density of a crosslinked network formed of the polymers.

The capability of the disclosed telechelic polymers to form crosslinked amorphous fluoropolymer networks can be useful in a variety of applications. For instance, the disclosed fluoropolymers can find application as crosslinking additives for fluoroelastomers as well as melt or solution processable resins for other thermosetting applications.

Fluoroolefins as described herein can also be formed to exhibit predetermined optical properties. For instance, one or both of the starting materials can include any of a variety of different chromophoric functional groups. Upon polymerization as described above, the formed polymers can exhibit useful properties, such as photoluminescence.

Such a motif can enable the fabrication of processable, single-layer devices capable of producing high efficiency electroluminescence for, e.g., polymer light emitting diodes (PLEDs).

In another embodiment, the disclosed polymers can be beneficially utilized in sensing applications. For example, the disclosed polymers can be utilized in chembio sensing applications, for instance for selective ion sensing for applications in environmental monitoring, medical diagnostics, and chemical warfare detection.

The invention may be more clearly understood with reference to the Examples set forth below.

Example 1

Telechelic polymers exhibiting dual fluoroolefin functionality were formed via step-growth polymerization of commercially available bis(trifluorovinyl) aryl ethers (1) with common bisphenols (2) affording a variety of polymers 3-10, as shown in Scheme 1, above and repeated below, and Table 1, below.

The optimized conditions utilized involved generation of the bisphenoxide sodium salt of the bisphenol (2) using NaH in DMF followed by slow addition of the bis(trifluorovinyl) aryl ether (1) at 80° C. This method produced polymers possessing either internal perfluoroolefins ($Z=-CF=CF-$) from the elimination of fluoride or hydrofluorinated ethyl groups ($Z=-CHFCF_2-$) after aqueous workup. Characteristics of the formed polymers are shown below in Table 2.

TABLE 2

| Polymer number | Z = CHFCF$_2$/ CF=CF | $M_n \times 10^{-3}$ GPC[a] (NMR)[b] | $M_w/M_n$ | $T_g$ (° C.)[c] | $T_d$ (° C.) N$_2$ (air)[d] |
|---|---|---|---|---|---|
| 3a | 0.67 | 1.3 (2.5) | 1.6 | 10 | 283, 534 (262, 525) |
| 3b | 0.22[e] | — | — | — | — |
| 4 | 0.24 | 1.2 (2.0) | 1.6 | 27 | 310, 550 (304, 600) |
| 5 | 0.10 | 1.2 | 1.6 | — | 400 (316) |
| 6a | 0.08 | 1.7 (4.1) | 1.4 | 12 | 340, 543 (560) |
| 6b | 1.0 | 12.1 | 2.0 | 88 | 324, 554 (551) |
| 7a | 1.3 | 23.4 (15.0) | 1.4 | 95 | 319, 524 (561) |
| 7b | 4.9[f] | 11.8 | 1.7 | 34 | 336, 513 (632) |
| 8 | 2.8 | 15.8 | 1.8 | 102 | 370, 521 (534) |
| 9 | 0.91 | (11.8) | — | 122 | 302, 543 (566) |
| 10 | 0.25 | (14.3) | — | 90 | 321, 534 (512) |

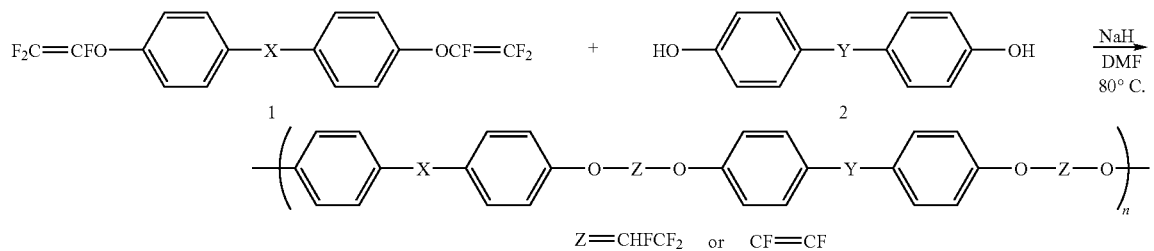

Scheme 1

TABLE 1

| Polymer number | X | Y |
|---|---|---|
| 3a | — | O |
| 3b | — | O |
| 4 | — | S |
| 5 | — | SO$_2$ |
| 6a | — | C(CF$_3$)$_2$ |
| 6b | — | C(CF$_3$)$_2$ |
| 7a | — | C(CH$_3$)$_2$ |
| 7b | — | C(CH$_3$)$_2$ |
| 8 | C(CF$_3$)$_2$ | C(CF$_3$)$_2$ |
| 9 | C(CF$_3$)$_2$ | C(CH$_3$)$_2$ |
| 10 | C(CH$_3$)$_2$ | C(CH$_3$)$_2$ |
| 11 | C(CH$_3$)$_2$ | C(CF$_3$)$_2$ |
| 12 | C(CH$_3$)$_2$ | — |
| 13 | C(CF$_3$)$_2$ | — |

TABLE 2-continued

| Polymer number | Z = CHFCF$_2$/ CF=CF | $M_n \times 10^{-3}$ GPC[a] (NMR)[b] | $M_w/M_n$ | $T_g$ (° C.)[c] | $T_d$ (° C.) N$_2$ (air)[d] |
|---|---|---|---|---|---|
| 11 | 1.1 | (35.5) | — | 44 | 343, 439 (565) |
| 12 | 1.4 | (13.6) | — | 99 | 313, 523 (436) |
| 13 | 4.0 | (15.0) | — | 112 | 310, 528 (486) |

[a]GPC in CHCl$_3$ using polystyrene standards.
[b]Determined by $^{19}$F NMR.
[c]DSC (10° C./min) in nitrogen, second heating.
[d]TGA onset at 10° C./min of chain extended polymers.
[e]Upon further dehydrofluorination employing LDA as a base.
[f]Cs$_2$CO$_3$ used as base (50 mol %).

Telechelic polymers 3a-6a were formed so as to exhibit narrow molecular weight distribution by controlling stoichiometry as well as the starting material order of addition. Analysis of the telechelics by gel permeation chromatography (GPC vs. polystyrene in $CHCl_3$) and other selected data is shown in Table 2. While the molecular weight was limited for the telechelic oligomers 3a-6a, high molecular weight step-growth polymers 6b-13 were easily prepared using a 1:1 molar ratio of the associated bisphenol and bis(trifluorovinyl) aryl ether.

Polymerization of bis(trifluorovinyl)aryl ethers with the bisphenols produced a 1:1 cis:trans ratio of internal fluoroolefins (Z=—CF=CF—), by $^{19}F$ NMR in all cases. The degree of unsaturation was controlled by substitution of the spacer group in either the bis(trifluorovinyl)aryl ethers or the bisphenols. As shown in Table 2, substitution with electron withdrawing groups (for example, X or Y=—C(CF$_3$)$_2$—) retarded the degree of unsaturation.

Using $Cs_2CO_3$ (50 mol %) as a base to prepare polymer 7b, 80% hydrofluorination was achieved. This result is consistent with the observation that the trifluoroethyl anion intermediate (Z=—$CF_2CF^-$—) is protonated and regenerates the carbonate base.

Differential scanning calorimetry (DSC) studies on the polymers demonstrated a broad range of glass transition temperatures. For all polymers studied, crosslinking of the internal fluoroolefin (Z=—CF=CF—) gave exotherm onsets at 220-300° C. DSC data for polymer 7a before and after heating to 300° C. in nitrogen showed a clear $T_g$ at 95° C. for the amorphous thermoplastic, where after crosslinking the polymer revealed no $T_g$, indicating a densely crosslinked network.

Polymers 3a-13 exhibited two decomposition temperatures ($T_d$) in nitrogen, whereas only a single $T_d$ was observed in air. Observed were two distinct decomposition events of polymer 7a, and this is representative of all polymers studied. No greater than 5% mass loss was observed after the first $T_d$ in nitrogen. Thermogravimetric analysis (TGA) in air show oxidation of the internal fluoroolefin and appears to be consistent with previous work reporting that fluorinated vinyl ethers oxidize in air at elevated temperatures and undergo stabilizing skeletal rearrangement before decomposition. Overall char yields ranged 30-40% at 900° C. in nitrogen, producing glass-like solids.

Attempts to radically polymerize the internal difluorodioxyvinylene groups with hv or chemical initiators such as azobisisobutyronitrile (AIBN), boron trifluoride ($BF_3$), or lead oxide (PbO) failed to induce chain growth.

Example 2

Chain extensions of telechelomers 3a, 4 and 6a formed as described in Example 1 were thermally controlled to initially induce step-growth trifluorovinyl aryl ether cyclopolymerization at 210° C. for 3 hours according to Scheme 2, above, producing linear and processable perfluorocyclobutyl (PFCB) aryl ether polymers (poly3a, 4, 6a). Characteristics of the polymers following chain extension are shown below in Table 3.

TABLE 3

| Polymer number | $M_n \times 10^{-3}$ GPC[a] | $M_w/M_n$ | $T_g$ (° C.)[b] |
|---|---|---|---|
| poly3a | 6.3 | 2.2 | 70 |
| poly4 | 9.8 | 3.3 | 57 |
| poly6a | 13.9 | 5.3 | 83 |

[a]GPC in $CHCl_3$ using polystyrene standards.
[b]DSC (10° C./min) in nitrogen, second heating.

Further heating to 225° C. induced crosslinking of the internal fluoroolefin groups. The network polymers formed from these heat treatments produced insoluble materials with no observable $T_g$ below 350° C.

The controlled thermal chain extension approach is exemplified using 3a which was subjected to neat thermal polymerization conditions at 210° C. for 3 h. The PFCB polymerization produced a film-forming polymer with $M_n$=6250. In this case, the internal perfluoroolefin moieties were unaffected as evidenced by $^{19}F$ NMR of the initial polymer 3a and the chain extended polymer. Of note, the trifluoroethyl groups (—$CHFCF_2$—) did not undergo thermal dehydrofluorination under these conditions.

Example 3

Fluoroolefins were formed as described above in Example 1 having photoluminescent properties. Specifically, bisphenols including a variety of different chromophoric functional groups were polymerized with bistrifluorovinyl ether according to Scheme 1 as shown above. In each polymer formed, the bistrifluorovinyl aromatic ether starting material included only a single bond between the two aromatic groups and the bisphenol starting material included a chromophoric functional group as illustrated below in Table 4.

TABLE 4

| polymer number | bisphenol starting monomer |
|---|---|
| P1 | 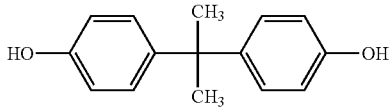 |

TABLE 4-continued

| polymer number | bisphenol starting monomer |
|---|---|
| P2 | 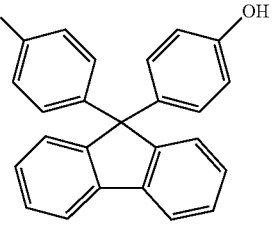 |
| P3 | 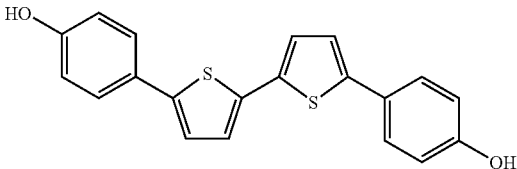 |
| P4 | 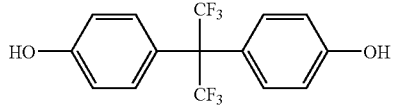 |
| P5 | 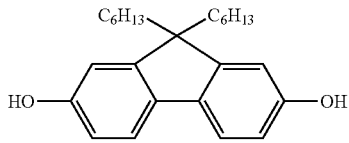 |
| P6 | 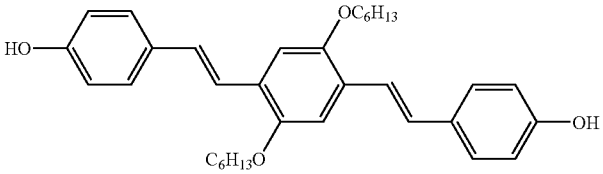 |
| P7 | 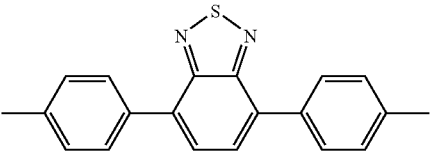 |
| P8 | 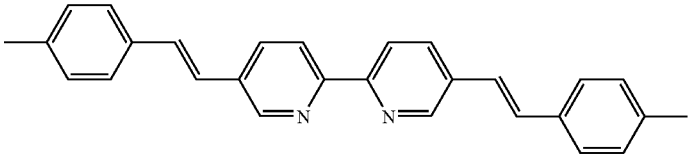 |

The formed polymers possessed the chromophoric functional groups with varying degrees of unsaturation. The polymers were prepared in high yield (greater than about 85%) and were solution processable in THF and cyclopentane, producing transparent, flexible films. Gel permeation chromatography revealed moderate molecular weight ($M_n$=5.8-17.3×10³(in CHCl₃ using PS as standard)) with narrow polydispersities (PDI 1.8-2.4) as a result of the step-growth polymerization methodology. TGA analysis revealed the fluorinated aryl ether polymers exhibited excellent thermal stabilities. Average decomposition temperatures of 360° C. and 400° C. were observed in nitrogen and air, respectively.

Excitation and emission spectra of polymers P3 and P5-P7 in solution (THF) and as spin cast films were obtained. Solution and solid state emission were excited at the maximum absorption wavelengths ($\lambda_{max}$) (Table 5, below). Red-shifting was observed for the polymers P3 and P5-P7 in solution based on the chromophoric segment in the polymer chain. Compared to solution studies, the film absorptions and emissions produced a red-shift in agreement with intra- and inter-chain π-π aryl stacking. Interestingly, the thiophene segmented polymer (P3) displayed significant broadening of the emission band as a film. This phenomenon may be indicative of pronounced π-π stacking of the thiophene units in the solid state.

TABLE 5

| Polymer | $M_n \times 10^{-3}$ GPC[a] | $M_w/M_n$ | $T_g$ (° C.)[b] | $T_d$(° C.) $N_2$ (air)[c] | Abs $\lambda_{max}$ sin (film) | PL $\lambda_{max}$ sin (film) | $\Phi_F{}^d$ sin |
|---|---|---|---|---|---|---|---|
| P3 | 8.2 | 1.5 | 104 | 338 (331) | 375 (379) | 457 (497) | 0.17 |
| P5 | 12.5 | 1.8 | 80 | 403 (334) | 263 (265) | 331 (368) | 0.10 |
| P6 | 12.3 | 2.1 | 88 | 360 (338) | 358 (382) | 404 (441) | 0.44 |
| p7 | 20.0 | 2.0 | — | 387 (443) | 383 (390) | 486 (492) | 0.16 |
| P8 | 22.7 | 2.8 | — | 370 (385) | 366 (368) | 406 (446) | 0.06 |

[a]GPC in CHCl₃ using polystyrene standards.
[b]DSC (10° C./min) in argon, second heating.
[c]TGA onset at 10° C./min.
[d]Determined with reference to L-tryptophan.

Most of the polymers exhibited similar yields with the exception of the p-phenylvinylene polymer (P6) which showed the highest measured value of 0.44.

Anion sensing is another potential application of semi-fluorinated conjugated polymers. Preliminary studies in this regard reveal that P3 exhibits a selective turn-on ratiometric fluorescence response to fluoride ion. Upon addition of excess tetrabutylammonium fluoride (TBAF) (80 equiv) to a THF solution of P3, a new absorption feature develops at 452 nm, while the putative π-π* transition at 370 nm remains essentially unchanged. Polymer P3 shows little photoluminescence upon excitation at 452 nm; however, upon addition of TBAF an immediate eight-fold increase in integrated emission intensity is observed with an attendant 40 nm bathochromic shift in emission maximum (from 480 to 520 nm). The response of P3 is selective for F⁻ over Cl⁻, Br⁻, I⁻, $H_2PO_4^-$ and $HSO_4^-$.

Example 4

Materials and Characterization Methods

All reagents were obtained from Tetramer Technologies, L.L.C., Aldrich Chemical Co., TCI America, Alfa Aesar, Fischer Scientific, Mallinckrodt, Baker and Adamson, or MP biomedicals, LLC and used as received. NMR spectra were recorded on a JEOL Eclipse+300 or Broker Avance 300 spectrometer and chemical shifts are reported in parts per million (δ ppm). ¹H NMR was internally referenced to tetramethylsilane (δ 0.0) or residual solvent signal, ¹³C NMR chemical shifts were reported relative to the peak for DMSO, and ¹⁹F NMR was referenced to CFCl₃. Gel permeation chromatography (GPC) data were collected using polystyrene as a standard (Polymer Labs Easical PS-2) using a Waters 2695 Alliance System eluted sequentially through Polymer Labs PLGel 5 mm Mixed-D and Mixed-E columns at 35° C., with absorption detection for samples in CHCl₃.

Formation Methods

Formation of 4,4'-t(2,2'-blpyridine)-5,5'-diyldi-2,1-ethenediyl[bisphenol].

Lithium ethoxide (1 M in ethanol, 2.42 mL, 2.42 mmol) was added dropwise to a stirred solution of 5,5'-bis(bromotriphenylphosphoniummethyl)-2,2'-bipyridine (1.00 g, 1.15 mmol) and 4-(tert-butyldimethylsiloxy)benzaldehyde (0.575 g, 2.42 mmol) dissolved in CH₂Cl₂ (60 mL) at room temperature. After 4 h, the reaction mixture was poured into an equal volume of H₂O. The organic layer was separated and the aqueous layer was extracted with CH₂Cl₂ (2×20 mL). Combined organic layers were washed with deionized water (2×50 mL), dried (MgSO₄), filtered, and concentrated under vacuum. The crude product and p-toluenesulfonic acid (0.100 g) were dissolved in toluene (50 mL) and the reaction mixture was heated to reflux. After 24 h, a brick red solid precipitated. The solid was collected by vacuum filtration and washed sequentially with H₂O (2×100 mL), methanol (2×100 mL), and hexanes (2×100 mL). The solid was then dried under vacuum to afford the title compound as a brick red solid (270 mg, 60%). Note: p-toluenesulfonic acid serves a dual role, isomerizing the crude mixture of (E)- and (Z)-isomers to the (E)-isomer, and quantitatively deprotecting the hydroxyl groups to afford the formed compound, 4,4'-t(2,2'-blpyridine)-5,5'-diyldi-2,1-ethenediyl[bisphenol].

¹H NMR (DMSO-d₆, 300 MHz) δ 8.81 (s, 2H, —OH)), 8.42 (d, J=7.89 Hz, 2H), 8.27 (d, J=7.89 Hz, 2H), 7.46-7.39 (m, 6H), 7.15-7.06 (m, 4H), 6.77 (d, J=7.89 Hz, 4H); ¹³C NMR (DMSO-d₆, 76 MHz) δ 158.7, 146.8, 135.3, 132.8, 129.0, 128.6, 128.1, 126.0, 122.0, 121.0, 116.3.

Formation of Polymer P9.

5,5'-Bis(4-hydroxystyryl)-2,2'-bipyridine (0.055 g, 0.14 mmol) and 2,2-bis(4-hydroxyphenyl)hexafluoropropane (0.437 g, 1.30 mmol) dissolved in anhydrous DMF (2 mL) were added dropwise to a stirred suspension of NaH (0.070 g, 2.92 mmol) in DMF (2 mL) at room temperature, and stirred for 1 h. 4,4'-Bis(4-trifluorovinyloxy)biphenyl (0.500 g, 1.44 mmol) in anhydrous DMF (2 mL) was transferred into the solution via syringe in a single portion. The flask was then placed in a preheated oil bath at 80° C. After 4 hours at this temperature, the solution contents were precipitated into H₂O, filtered under vacuum, and washed sequentially with deionized H₂O (2×100 mL), methanol (2×100 mL), and hexanes (2×100 mL). The solid polymer was dried in a vacuum oven at 60° C. for 24 h. Additional purification was performed by dissolving the dried polymer in a minimal amount of THF and precipitated in deionized water, filtering, and washing sequentially with methanol (2×100 mL) and hexanes (2×100 mL). The solid polymer was then dried in a vacuum oven at 60° C. for an additional 24 h to afford the polymer as a pale yellow fibrous solid (0.580 g, 58%).

¹H NMR (DMSO-d₆, 300 MHz) δ 8.40-8.35 (m), 8.20-8.15 (m), 7.80-7.60 (m), 7.50-7.27 (m), 6.84 (broad dt, J=58.4 Hz, CHFCF₂); ¹⁹F NMR (DMSO-d₆, 283 MHz) δ −63.3 [s, C(CF₃)₂], −85.2 (d, Jae=144.8 Hz, CHFCF₂), −120.8 and 122.5 [d, J=39.6 Hz, (Z) CF═CF], −127.2 and −129.2 [d, J=108.6 Hz, (E)-CF═CF], −141.2 (d, J=59.2 Hz, CHFCF₂). GPC in CHCl₃, relative to polystyrene gave a monomodal distribution of M.=22 800 ($M_w/M_n$=2.8). DSC analysis on the second heating at 10° C. min to 200° C. gave $T_g$=92° C. and TGA (10° C. min') gave $T_d$ (at 10 wt % loss)=420° C. in nitrogen and 426° C. in air. Anal. calcd for $C_{30.98}H_{17.44}N_{0.04}O_4F_{11.28}$ (using the monomer ratios reported in Scheme 3, below): C, 55.66; H, 2.63; N, 0.08. Found: C, 55.36; H, 2.96; N, 0.24.

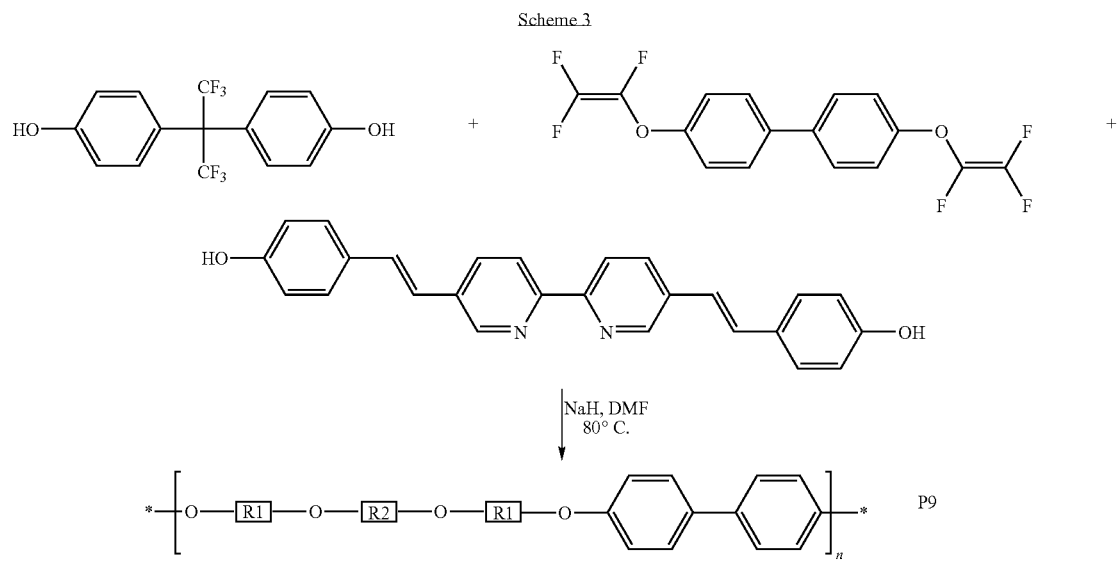

Scheme 3 wherein R1=73% C—F=CF—
27% —CH(F)—CF$_2$—
R2=98% -(p-C$_6$H$_4$)—C(CF$_3$)$_2$-(p-C$_6$H$_4$)—
2% chromophore General Spectroscopic Methods Photoluminescence (PL) spectra were acquired on a Varian Cary Eclipse fluorescence spectrophotometer. Absorption spectra were recorded on a Varian Cary 50 Bio absorption spectrophotometer. Samples for all absorbance and PL spectra used tetrahydrofuran (THF) as solvent in Spectrosil quartz cuvettes having a path length of 1 cm. Initial solutions for PL analysis were filtered through 0.2 gm PTFE syringe filters prior to analysis. The THF solvent for all optical measurements was purified and made anhydrous/anaerobic by passage through alumina columns under N$_2$ atmosphere employing an MBraun solvent purification system. Photoluminescence quantum yields were measured relative to quinine bisulfate ($\phi$=0.564) in 0.1 N aqueous sulfuric acid. Polymer concentrations are reported as moles of bipyridyl monomer unit per L. Metal salts used for ion screening were Co(NO$_3$)$_2$.6 H$_2$O, NiSO$_4$.6 H$_2$O, Cu(ClO$_4$)$_2$.6H$_2$O, Zn(ClO$_4$)2.6 H$_2$O, Cd(ClO$_4$)$_2$.6 H$_2$O, K(PF$_6$), Na(PF$_6$), Mg(SO$_4$), CaCl$_2$, Eu(NO$_3$)$_3$, [Cu(NCMe)$_4$][BF$_4$], Hg(O$_2$CCF$_3$)$_2$, and Fe(OTf)$_2$.

Metal Ion Selectivity of P9.

A 3.0 mL aliquot of 3×10$^5$ M P9 was added to a cuvette. 4.5×10$^4$ L of 2.0×10$^2$ M metal (20 equiv.) was added to the polymer solution. Absorbance changes were observed for transitional metals. The experiment was repeated and followed by PL spectroscopy using 3.0×107 M P9 and a 5.0×10$^7$ L aliquot of the metal ion solution.

Absorption Titration of Polymer with Metal Ions.

A 3.0 mL aliquot of the 3×10$^5$ M polymer in THF solution was added to a cuvette. Aliquots (2.25×10$^6$ L) of 2.0×10$^3$ M metal ion solution were added to the polymer solution and changes were followed by collecting an absorption spectrum after each addition.

PL Titration of Polymer with Metal Ions.

This was carried out according to the same methods as for absorption titration, but using 3.0×10$^6$ M P9, and followed by photoluminescence with $\lambda_{ex}$=370 or 420 nm.

Displacement Test of Anions to Metal in M$^{2+}$-P9) Complexes (M$^{2+}$=Zn$^{2+}$ or Cu$^{2+}$).

A 3.0 mL aliquot of the 3.0×10$^6$ M P9 was added to a cuvette, followed by 4.5×10$^6$ L of 2.0×10$^3$ M Zn(ClO$_4$)$_2$ or Cu(ClO$_4$)$_2$ and collection of an initial emission spectrum. A 0.45×10$^6$ L aliquot of 2.0×10$^2$ M anion solution (F, Cl, Br, I, HSO$^4$, PO$_4^3$, or O$_2$CCH$_3$, as tetrabutylammonium salts) was then added to the cell and another emission spectrum collected.

Fluorescence Titration of M$^{2+}$-P9 (M=Zn$^{2+}$ or Cu$^{2+}$) with Anions.

A 3.0 mL aliquot of 1.5×10$^6$ M P9 in THF was added to a quartz cell. 2.25×10$^6$ L (1 equiv.) of 2.0×10$^3$ M Zn(ClO$_4$)$_2$ or Cu(ClO$_4$)$_2$ solution was added to the cuvette to make M$^{2+}$-P9. Both Zn$^{2+}$-P9 and Cu$^{2+}$-P9 complexes were titrated by addition of 11×10$^6$ L (0.5 equiv.) aliquots of 2.0×10$^4$ M tetrabutylammonium fluoride. The titration was followed by PL spectroscopy up to addition of ten equiv. of anion. The Cu$^{2+}$-P9 complex was titrated with tetrabutylammonium cyanide solution in identical fashion. The excitation wavelength was 370 nm for these titrations.

Absorption Titration of Ze$^{2+}$-P9 with F.

As described for fluorescence titration, but using 2.0×10$^5$ M Zn$^{2+}$-P9 and 1.5×10$^6$ L (0.5 equiv.) of 2.0×10$^3$ M tetrabutylammonium fluoride and following titration by absorption spectroscopy.

Fluorescence Titration of CN with Cu$^{2+}$-P9 in THF from 0.5 equiv. to 10 equiv.

A 3.0 mL aliquot of the 1.5×10$^6$ M P9 in THF solution was added to a cuvette. A 2.25×10$^6$ L (1 equiv.) aliquot of 2.0×10$^3$ M Cu(ClO$_4$)$_2$ solution was added to the cuvette to generate Cu$^{2+}$-P9. 11×10$^6$ L (0.5 equiv.) of the 2.0×10$^4$ M CN in THF solution was added to the Cu$^{2+}$-P9 after each scan (A, =370 rim) until a total of ten equiv. CN had been added.

Results

Polymer P9 was readily prepared in 58% isolated yield by step-growth condensation of 5,5'-bis(4-hydroxystyryl)-2,2'-bipyridyl and commercially-available 2,2'-bis(4-hydroxyphenyl)hexafluoropropane (6F bisphenol-A) and 4,4'-bis (trifluorovinyloxy)biphenyl as shown above in Scheme 3. GPC analysis showed a monomodal distribution and moderate molecular weight ($M_n$=22,800, $M_w/M_n$=2.8). Proton and NMR spectral analyses indicate 73% and 27% —CH(F)—CF2— linkers (R1, Scheme 3) and 2% bipyridine monomer composition. Pale yellow P9 is intensely photoluminescent in the solid state or solution under UV irradiation ($\lambda_{em}$=426 nm, with a quantum yield (φ) of 0.49(0.06) (average of seven independent determinations) with $\lambda_{ex}$=370 nm in THF) and is soluble in common organic solvents such as chloroform, dichloromethane, THF, and DMSO. Although this work focuses on the behavior of P9 in solution, P9 can be spun or drop cast to form high quality, free-standing transparent films that retain the high luminescence of the initially precipitated sample. The thermal robustness of P9 was confirmed by DSC analysis ($T_g$=92° C.) and TGA, with $T_d$=420° C. (at 10 wt % loss) in nitrogen and 426° C. in air. Even without protection under an inert nitrogen environment, these values are well above the operation temperature of thin film devices and are markedly higher than common fluorine-free organic polymers in air.

The response of P9 to an excess (20 equiv.) of metal ions in solution was examined by absorption spectroscopy. Metal-free P9 exhibits $\lambda_{max}$ at 368 nm, and the absorption spectrum is not significantly impacted by alkali or alkali earth metals ($Na^+$, $K^+$, $Mg^{2+}$, or $Ca^{2+}$). Transition and lanthanide ions, however, induced a notable bathochromic shift of up to 32 nm in $\lambda_{max}$, the largest shift being observed for $Cu^{2+}$ ($\lambda_{max}$=400 nm). The observation of this type of ionochromic behavior, well known for small molecule bipyridine derivatives suggests that bipyridyl units in P9 exhibit chelation-induced electronic and geometric perturbations similar to those of polymer-free analogues. To determine whether incorporation into the fluorinated aromatic vinylene ether (FAVE) polymer had altered the affinity of bipyridine units for metal ions, the dissociation constant ($K_d$, Table 6, below) of the P9—$Zn^{2+}$ complex was determined from a spectroscopic titration ($K_d$ was derived using a modification of the Benesi-Hildebrand method).

TABLE 6

| Ion | $K_d$/μN | $I/I_o$ $\lambda_{ex=370\,nm}$ | $I/I_o$ $\lambda_{ex=420\,nm}$ | $\lambda_{max}$/nm |
|---|---|---|---|---|
| $Co^{2+}$ | 6.6 | 0.02 | 0.24 | 394 |
| $Cu^{2+}$ | 33 | 0.01 | 0.22 | 400 |
| $Zn^{2+}$ | 0.58 | 0.20 | 9.3 | 390 |
| $Cd^{2+}$ | 9.5 | 0.52 | 1.1 | 390 |
| $Hg^{2+}$ | 24 | 0.35 | 3.7 | 390 |

The $K_d$ determined for P9 (5.8×10⁷ M) is within an order of magnitude of that for unmodified 2,2'-bipyridine under identical conditions (4.6×10⁶ M), indicating that P9 binds slightly more strongly to $Zn^{2+}$ than does 2,2'-bipyridine and further confirming that incorporation into the polymer does not compromise ligating ability. The somewhat higher affinity of metals for P9 versus 2,2'-bipyridine is anticipated because of the electron-releasing p-aryloxystyryl substituents at the 5 and 5' positions of bipyridyl units in the polymer. Although bipyridine-substituted polymers sometimes become insoluble upon metallation due to the formation of coordination crosslinking there is no evidence of precipitation upon metallation of P9, presumably due to the low percentage of bipyridyl units and favorable solubility of the fluoropolymer backbone.

The impact of excess (20 equiv.) metal ions on P9 photoluminescence was investigated. Two excitation wavelengths were selected for this study: one near $\lambda_{max}$ for metal-free P9 (370 nm) and another near $\lambda_{max}$ of bathochromically shifted transition metal-P9 complexes (420 nm). Metal-free P9 has little absorbance at the latter wavelength, so only emission from the $M^{n+}$-P9 complex will be observed. The relative integrated emission intensities (380-730 when $\lambda_{ex}$=370 nm or 430-830 nm when $\lambda_{ex}$=420) of P9 with selected metal ions upon excitation at both wavelengths are provided in Table 6.

Fluorescent titrations of P9 with selected transition metals were undertaken and dissociation constants were determined from these data (Table 6). The 10-fold increase in integrated emission exhibited by P9 is in the range of commercially-available fluorescent indicators for $Zn^{2+}$ suggesting that, although P9 is not water soluble, this system may be practically applicable in other contexts.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention which is herein defined and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A telechelic polymer comprising endgroup fluoroolefin functionalities, the telechelic polymer defining a polymer backbone comprising the following structure:

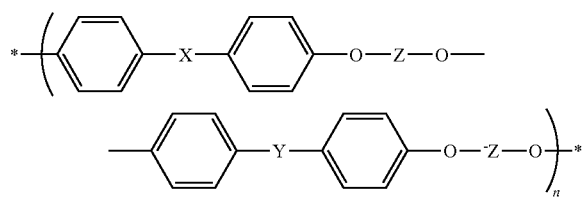

wherein

Z is $CHFCF_2$ or $CF=CF$ and

X and Y are independently selected from the group consisting of bond, a substituted alkyl group, an unsubstituted alkyl group, a saturated alkyl group, an unsaturated alkyl group, a substituted aromatic group, an unsubstituted aromatic group, an atom, and combinations thereof.

2. The telechelic polymer according to claim 1, wherein the endgroup fluoroolefin functionalities are trifluorovinyl aromatic ether endgroups.

3. The telechelic polymer according to claim 1, wherein at least one of X and Y comprises an aromatic ring.

4. The telechelic polymer according to claim 1, wherein at least one of X and Y is a bond.

5. The telechelic polymer according to claim 1 wherein at least one of X and Y is a perfluoropropane group.

6. The telechelic polymer according to claim 1, wherein at least one of X and Y is an oxygen atom.

7. The telechelic polymer according to claim 1, wherein the telechelic polymer defines a degree of unsaturation of less than about 92%.

8. The telechelic polymer according to claim 1, wherein the telechelic polymer defines a degree of unsaturation of less than about 5%.

9. The telechelic polymer according to claim 1, further comprising perfluorocyclobutyl rings along the polymer backbone.

10. The telechelic polymer according to claim 1, wherein the telechelic polymer is associated with a metal.

* * * * *

UNITED STATES PATENT AND TRADEMARK OFFICE
CERTIFICATE OF CORRECTION

| | | |
|---|---|---|
| PATENT NO. | : 7,754,837 B1 | Page 1 of 1 |
| APPLICATION NO. | : 12/044447 | |
| DATED | : July 13, 2010 | |
| INVENTOR(S) | : Smith, Jr. et al. | |

It is certified that error appears in the above-identified patent and that said Letters Patent is hereby corrected as shown below:

Cover Page, Title "Flourinated Aryl Ether..." should read --Fluorinated Aryl Ether...--

Signed and Sealed this
Third Day of April, 2012

David J. Kappos
*Director of the United States Patent and Trademark Office*

UNITED STATES PATENT AND TRADEMARK OFFICE
CERTIFICATE OF CORRECTION

PATENT NO. : 7,754,837 B1  
APPLICATION NO. : 12/044447  
DATED : July 13, 2010  
INVENTOR(S) : Smith, Jr. et al.

Page 1 of 1

It is certified that error appears in the above-identified patent and that said Letters Patent is hereby corrected as shown below:

Title Page, Item (54) and at Column 1, lines 1-4, Title "Flourinated Aryl Ether..." should read --Fluorinated Aryl Ether...--

This certificate supersedes the Certificate of Correction issued April 3, 2012.

Signed and Sealed this
First Day of May, 2012

David J. Kappos
*Director of the United States Patent and Trademark Office*